US011914726B2

(12) United States Patent
Wallach

(10) Patent No.: US 11,914,726 B2
(45) Date of Patent: Feb. 27, 2024

(54) ACCESS CONTROL FOR PROCESSOR REGISTERS BASED ON EXECUTION DOMAINS

(71) Applicant: Micron Technology, Inc., Boise, ID (US)

(72) Inventor: Steven Jeffrey Wallach, Dallas, TX (US)

(73) Assignee: Micron Technology, Inc., Boise, ID (US)

(*) Notice: Subject to any disclaimer, the term of this patent is extended or adjusted under 35 U.S.C. 154(b) by 654 days.

(21) Appl. No.: 16/520,290

(22) Filed: Jul. 23, 2019

(65) Prior Publication Data

US 2020/0074093 A1 Mar. 5, 2020

Related U.S. Application Data

(60) Provisional application No. 62/724,929, filed on Aug. 30, 2018.

(51) Int. Cl.
*G06F 21/62* (2013.01)
*G06F 9/455* (2018.01)

(52) U.S. Cl.
CPC ...... *G06F 21/6209* (2013.01); *G06F 9/45558* (2013.01); *G06F 2009/45583* (2013.01)

(58) Field of Classification Search
CPC ............. G06F 21/6209; G06F 9/45558; G06F 2009/45583; G06F 2212/1052;
(Continued)

(56) References Cited

U.S. PATENT DOCUMENTS 4,386,399 A 5/1983 Rasala et al.
4,409,655 A 10/1983 Wallach et al.
(Continued)

FOREIGN PATENT DOCUMENTS

CN 105550014 5/2016
WO 2013174503 11/2013
(Continued)

OTHER PUBLICATIONS

Security Configuration for Memory Address Translation from Object Specific Virtual Address Spaces to a Physical Address Space, U.S. Appl. No. 16/520,211, filed Jul. 23, 2019 Inventor: Steven Wallach Status: Application Undergoing Preexam Status Date: Jul. 23, 2019.
(Continued)

*Primary Examiner* — Bruce S Ashley
(74) *Attorney, Agent, or Firm* — Greenberg Traurig

(57) ABSTRACT

Systems, apparatuses, and methods related to a processor having configurable permission data for controlling access to a register of the processor from instructions running in different domains are described. Instructions can be used in predefined execution domains, such as hypervisor, operating system, application, etc. Different permission bits can be set for instructions running in different domains. In response to an instruction executed in the processor generates a request to access the register, the processor is configured to determine whether to accept or reject the request based on a permission bit provided in the permission data corresponding to an execution domain in which the instruction is running.

6 Claims, 4 Drawing Sheets

(58) Field of Classification Search
CPC .............. G06F 12/1009; G06F 12/145; G06F 2009/45587; G06F 21/53; G06F 9/4806; G06F 9/468; G06F 9/5016
See application file for complete search history.

(56) References Cited

U.S. PATENT DOCUMENTS

| | | | |
|---|---|---|---|
| 4,525,780 | A | 6/1985 | Bratt et al. |
| 4,821,184 | A | 4/1989 | Clancy et al. |
| 5,280,614 | A | 1/1994 | Munroe et al. |
| 6,393,544 | B1 | 5/2002 | Bryg et al. |
| 6,446,188 | B1 | 9/2002 | Henderson et al. |
| 7,213,247 | B1 | 5/2007 | Wilner et al. |
| 7,370,193 | B2 | 5/2008 | Shao et al. |
| 7,581,089 | B1 | 8/2009 | White |
| 8,245,270 | B2 | 8/2012 | Cooperstein et al. |
| 8,607,299 | B2 | 12/2013 | Baker |
| 8,713,563 | B2 | 4/2014 | Kondoh et al. |
| 9,122,890 | B2 | 9/2015 | Grocutt et al. |
| 9,405,515 | B1 | 8/2016 | Bertram et al. |
| 9,519,779 | B2 | 12/2016 | Ghosh et al. |
| 9,575,784 | B1 | 2/2017 | Aron et al. |
| 9,852,084 | B1 | 12/2017 | Soderquist et al. |
| 10,043,001 | B2 | 8/2018 | Ghosh et al. |
| 10,757,100 | B2 | 8/2020 | Angelino et al. |
| 10,915,457 | B2 | 2/2021 | Wallach |
| 10,915,465 | B2 | 2/2021 | Wallach |
| 10,942,863 | B2 | 3/2021 | Wallach |
| 10,984,097 | B2 | 4/2021 | Ghosh et al. |
| 11,182,507 | B2 | 11/2021 | Wallach |
| 11,436,156 | B2 | 9/2022 | Wallach |
| 11,481,241 | B2 | 10/2022 | Wallach |
| 11,500,665 | B2 | 11/2022 | Wallach |
| 11,561,904 | B2 | 1/2023 | Wallach |
| 2002/0184345 | A1* | 12/2002 | Masuyama ............ H04L 41/082 709/220 |
| 2004/0078631 | A1 | 4/2004 | Rogers et al. |
| 2004/0133777 | A1 | 7/2004 | Kiriansky et al. |
| 2004/0221036 | A1* | 11/2004 | Smith ...................... G06F 9/468 709/225 |
| 2005/0257243 | A1 | 11/2005 | Baker |
| 2007/0050586 | A1 | 3/2007 | Shin et al. |
| 2008/0086729 | A1 | 4/2008 | Kondoh et al. |
| 2008/0091891 | A1 | 4/2008 | Shiota et al. |
| 2008/0104586 | A1 | 5/2008 | Thorton et al. |
| 2008/0162680 | A1 | 7/2008 | Zimmer et al. |
| 2008/0244206 | A1 | 10/2008 | Heo et al. |
| 2008/0250216 | A1 | 10/2008 | Kershaw et al. |
| 2008/0250217 | A1 | 10/2008 | Kershaw et al. |
| 2008/0276051 | A1 | 11/2008 | Renno |
| 2009/0204785 | A1 | 8/2009 | Yates, Jr. et al. |
| 2009/0259846 | A1 | 10/2009 | Watt et al. |
| 2010/0042980 | A1 | 2/2010 | Wright et al. |
| 2010/0082991 | A1 | 4/2010 | Baldwin et al. |
| 2010/0162243 | A1 | 6/2010 | Barde et al. |
| 2010/0228936 | A1 | 9/2010 | Wright et al. |
| 2010/0228943 | A1* | 9/2010 | Deshpande ......... G06F 12/1081 711/206 |
| 2010/0235598 | A1 | 9/2010 | Bouvier |
| 2011/0055528 | A1 | 3/2011 | Kondoh et al. |
| 2012/0036334 | A1 | 2/2012 | Horman et al. |
| 2012/0042144 | A1 | 2/2012 | Grisenthwaite |
| 2013/0132690 | A1* | 5/2013 | Epstein ............... G06F 11/2058 711/159 |
| 2013/0132695 | A1 | 5/2013 | Heo et al. |
| 2013/0151831 | A1 | 6/2013 | Bealkowski et al. |
| 2014/0075581 | A1 | 3/2014 | Grocutt et al. |
| 2014/0108701 | A1 | 4/2014 | Liljeberg |
| 2014/0173169 | A1 | 6/2014 | Liu et al. |
| 2014/0331019 | A1 | 11/2014 | Parker et al. |
| 2014/0331023 | A1 | 11/2014 | Sharp et al. |
| 2015/0100717 | A1 | 4/2015 | Bennett et al. |
| 2015/0128249 | A1 | 5/2015 | Alexandrian et al. |
| 2015/0180894 | A1 | 6/2015 | Sadovsky et al. |
| 2015/0301850 | A1 | 10/2015 | Jeong et al. |
| 2016/0110298 | A1* | 4/2016 | Koufaty ................. G06F 21/52 726/28 |
| 2016/0210082 | A1 | 7/2016 | Frank et al. |
| 2016/0299851 | A1 | 10/2016 | Mattson, Jr. et al. |
| 2016/0350019 | A1 | 12/2016 | Koufaty et al. |
| 2016/0381050 | A1 | 12/2016 | Shanbhogue et al. |
| 2017/0060783 | A1 | 3/2017 | Chiu et al. |
| 2017/0367036 | A1 | 12/2017 | Chen et al. |
| 2018/0048648 | A1 | 2/2018 | Angelino et al. |
| 2018/0060244 | A1* | 3/2018 | Godard ..................... G06F 9/00 |
| 2018/0095902 | A1 | 4/2018 | Lemay et al. |
| 2018/0121665 | A1 | 5/2018 | Anderson et al. |
| 2019/0102537 | A1 | 4/2019 | Zhang et al. |
| 2019/0196983 | A1 | 6/2019 | Khosravi et al. |
| 2020/0073693 | A1 | 3/2020 | Wallach |
| 2020/0073694 | A1 | 3/2020 | Wallach |
| 2020/0073820 | A1 | 3/2020 | Wallach |
| 2020/0073821 | A1 | 3/2020 | Wallach |
| 2020/0073822 | A1 | 3/2020 | Wallach |
| 2020/0073827 | A1 | 3/2020 | Wallach |
| 2020/0074094 | A1 | 3/2020 | Wallach |
| 2021/0141742 | A1 | 5/2021 | Wallach |
| 2021/0149817 | A1 | 5/2021 | Wallach |
| 2021/0157741 | A1 | 5/2021 | Wallach |
| 2021/0240619 | A1 | 8/2021 | Earnshaw |
| 2022/0050908 | A1 | 2/2022 | Wallach |
| 2022/0414019 | A1 | 12/2022 | Wallach |
| 2023/0004420 | A1 | 1/2023 | Wallach |

FOREIGN PATENT DOCUMENTS

| | | |
|---|---|---|
| WO | 2013174503 A1 | 11/2013 |
| WO | 2016164424 | 10/2016 |

OTHER PUBLICATIONS

Domain Register for Instructions Being Executed in Computer Processors, U.S. Appl. No. 16/520,298, filed Jul. 23, 2019 Inventor: Steven Wallach Status: Application Undergoing Preexam Processing, Status Date: Jul. 23, 2019.

Domain Crossing in Executing Instructions in Computer Processors, U.S. Appl. No. 16/250,299, filed Jul. 23, 2019 Inventor: Steven Wallach Status: Application Undergoing Preexam Processing Status Date: Jul. 23, 2019.

Dynamic Configuration of a Computer Processor Based on the Presence of a Hypervisor, U.S. Appl. No. 16/250,304, filed Jul. 23, 2019 Inventor: Steven Wallach Status: Application Undergoing Preexam Processing Status Date: Jul. 23, 2019.

Virtual Machine Register in a Computer Processor, U.S. Appl. No. 16/250,310, filed Jul. 23, 2019 Inventor: Steven Wallach Status: Application Undergoing Preexam Processing Status Date: Jul. 23, 2019.

Memory Access Control Through Permissions Specified in Page Table Entries for Execution Domains, U.S. Appl. No. 16/250,292, filed Jul. 23, 2019 Inventor: Steven Wallach Status: Application Undergoing Preexam Processing Status Date: Jul. 23, 2019.

Security Configurations in Page Table Entries for Execution Domains U.S. Appl. No. 16/520,296, filed Jul. 23, 2019 Inventor: Steven Wallach Status: Application Undergoing Preexam Processing Status Date: Jul. 23, 2019.

"Hash table. Collision resolution by chaining (closed addressing)", Algorithms and Data Strcutures: with implementations in Java and C++, http://www.algolist.net/Data_structures/Hash_table/Chaining, printed on Aug. 30, 2018.

Call stack, Wikipedia, printed on Aug. 10, 2018.

Capability-based addressing, Wikipedia, printed on Sep. 13, 2018.

Explain Hashed page tables in operating system, https://cs.stackexchange.com/questions/85207/explain-hashed-page-tables-in-operating system, printed on Aug. 17, 2018.

G. J. Myers, B. R. S. Buckingham, "A Hardware Implemenation of Capability-based Addressing", ACM SIGARCH Computer Architecture News Homepage archive, vol. 8, Iss. 6, Oct. 1980.

George Radin, Peter R. Schneider, "An Architecture for an Extended Machine With Protected Addressing", May 21, 1976.

(56) References Cited

OTHER PUBLICATIONS

Hash table, Wikipedia, printed on Aug. 30, 2018.
Hypervisor, Wikipedia, printed on Apr. 19, 2018.
Michael D. Schroeder, Jerome H. Saltzer, "A Hardware Architecture for Implementing Protection Rings", Presented at the Third ACM Symposium on Operating Systems Principles, Palo Alto, CA, Oct. 1971.
Page replacement algorithm, Wikipedia, printed on Jul. 31, 2018.
Page table, Wikipedia, printed on Jul. 31, 2018.
Protection ring, Wikipedia, printed on Jul. 31, 2018.
R. S. Fabry, "Capability-Based Addressing", Communications of the ACM, Jul. 1974.
Sandbox (computer security), Wikipedia, printed on Aug. 21, 2018.
Stack register, Wikipedia, printed on Aug. 10, 2018.
The RISC-V Instruction Set Manual, vol. II: Privileged Architecture, May 7, 2017.
Martinsen, Jayce. "Implementation of Intel Virtual Machine Extension Root Operation on the NPS Least Privilege Separation Kernel." Naval Postgraduate School thesis, Sep. 2010.
Vmware. "Mechanisms to determine if software is running in a Vmware virtual machine." Retrieved from the Internet <https://kb.vmware.com/s/article/1009458> on Nov. 23, 2021.
International Search Report and Written Opinion, PCT/US2019/048015, dated Dec. 12, 2019.
International Search Report and Written Opinion, PCT/US2019/048006, dated Dec. 11, 2019.
International Search Report and Written Opinion, PCT/US2019/048008, dated Dec. 12, 2019.
International Search Report and Written Opinion, PCT/US2019/048023, dated Dec. 17, 2019.
International Search Report and Written Opinion, PCT/US2019/048020, dated Dec. 17, 2019.
International Search Report and Written Opinion, PCT/US2019/048019, dated Dec. 17, 2019.
International Search Report and Written Opinion, PCT/US2019/048013, dated Dec. 13, 2019.
International Search Report and Written Opinion, PCT/US2019/048018, dated Dec. 17, 2019.
Extended European Search Report, EP19856112.8, dated Apr. 14, 2022.
Extended European Search Report, EP19854049.4, dated Apr. 7, 2022.
Extended European Search Report, EP19853813.4, dated Apr. 4, 2022.
Extended European Search Report, EP19855829.8, dated Apr. 11, 2022.
Extended European Search Report, EP19854485.7, dated Apr. 11, 2022.
Extended European Search Report, EP19854059.3, dated Apr. 11, 2022.
Extended European Search Report, EP19854058.5, dated Apr. 20, 2022.
Fernandez, Eduardo B., et al. "Patterns for the secure and reliable execution of processes." Pattern Languages of Programs, ACM, Oct. 18, 2008.
Vilanova, Lluis, et al. "CODOMs: Protecting Software with Code-centric Memory Domains." IEEE, Jun. 14, 2014.
Vilanova, Lluis. "CODOMs: Protecting Software with Code-centric Memory Domains." IEEE, 2014.
1 Extended European Search Report, EP19855925.4, dated Apr. 11, 2022.
Lluis Vilanove, et al. "CODOMs: Protecting Software with Code-centric Memory Domains." ACM SIGARCH Computer Architecture news, vol. 42, Issue 3, Jun. 2014.
Lluis Vilanova et al., "CODOMs: Protecting Software with Code-centric Memory Domains," ACM SIGARCH Computer Architecture News, Jun. 2014.
Security Configuration for Memory Address Translation from Object Specific Virtual Address Spaces to a Physical Address Space, U.S. Appl. No. 16/520,311, filed Jul. 23, 2019 Confirmation: 9553 Status Date: Jan. 9, 2023 Inventor: Steven Wallach Status: Final Rejection Mailed.
Memory Configured to Store Instructions of a Predefined Set of Domains Controllable Via a Domain Register for Instructions Being Executed in a Computer Processor, U.S. Appl. No. 16/520,298, filed Jul. 23, 2019 Confirmation: 9243 Status Date: Jan. 20, 2021 Inventor: Steven Wallach Parented Case.
Domain Register for Instructions Being Executed in Computer Processors, U.S. Appl. No. 17/154,722, filed Jan. 21, 2021 Confirmation: 4072 Status Date: Dec. 1, 2022 Inventor: Steven Wallach Notive of Allownace Mailed—application Received in Office of Publications.
Domain Crossing in Executing Instructions in Computer Processors, U.S. Appl. No. 16/520,299, filed Jul. 23, 2019 Confirmation: 6505 Status Date: Nov. 3, 2021 Inventor: Steven Wallach Parented Case.
Domain Crossing in Executing Instructions in Computer Processors, filed Oct. 27, 2021 Confirmation: 8247 Status Date: Nov. 13, 2021 Inventor: Steven Wallach Docketed New Case—Ready for Examination.
Dynamic Configuration of a Computer Processor based on the Presence of a Hypervisor, filed Jul. 23, 2019 Confirmation: 1033 Status Date: Oct. 26, 2022 Inventor: Steven Wallach Patented Case.
Dynamic Configuration of a Computer Processor based on the Presence of a Hypervisor, filed Nov. 11, 2022 Confirmation: 2411 Status Date: Nov. 30, 2022 Inventor: Steven Wallach Docketed New Case—Ready for Examination.
Virtual Machine Register in a Computer Processor, U.S. Appl. No. 16/520,310, filed Jul. 23, 2019 Confirmation: 3991 Status Date: Oct. 5, 2022 Inventor: Steven Wallach Patented Case.
Virtual Machine Register in a Computer Processor, U.S. Appl. No. 17/942,558, filed Sep. 12, 2022 Confirmation: 1068 Status Date: Sep. 29, 2022 Inventor: Steven Wallach Docketed New Case—Ready for Examination.
Memory Access Control through Permissions Specified in Page Table Entries for Execution Domains, U.S. Appl. No. 16/520,292 Confirmation: 8203 Status Date: Jan. 20, 2021 Inventor: Steven Wallach Patented Case.
Memory Access Control through Permissions Specified in Page Table Entries for Execution Domains, U.S. Appl. No. 17/158,979, filed Jan. 26, 2021 Confirmation: 5463 Status Date: Aug. 17, 2022 Inventor: Steven Wallach Patented Case.
Memory Access Control through Permissions Specified in Page Table Entries for Execution Domains, U.S. Appl. No. 17/899,366, filed Aug. 30, 2022 Confirmation 1016 Status Date: Sep. 25, 2022 Inventor: Steven Wallach Docketed New Case—Ready for Examination.
Security Configurations in Page Table Entires for Execution Domains using a Sandbox Application Operation, U.S. Appl. No. 16/520,296, filed Jul. 23, 2019 Confirmation 7614 Status Date: Feb. 17, 2021 Inventor: Steven Wallach Patented Case.
Seculity Configurations in Page Table Entries for Execution Domains, U.S. Appl. No. 17/170,763, filed Feb. 8, 2021 Confirmation: 7019 Status Date: Jan. 4, 2023 Inventor: Steven Wallach Patented Case.
Seculity Configurations in Page Table Entries for Execution Domains, U.S. Appl. No. 18/064,778, filed Dec. 12, 2022 Confirmation: 8826 Status Date: Jan. 6, 2023 Inventor: Steven Wallach Docketed New Case—Ready for Examination.
Inoue, Hiroaki, et al., "Dynamic Security Domain Scaling on Symmetric Multiprocessors for Future High-End Embedded Systems." 2007 5th IEEE/ACM/IFIP International Conference on Hardware/Software Codesign and System Synthesis (CODES+ISSS), 2007.
Kim, Haeyoung, et al., "DEMIX: Domain-Enforced Memory Isolation for Embedded System." MDPI, Mar. 29, 2023.
Qing, Sihan, et al., "A Dynamically Modified Privilege Control Policy." IEEE, Proceedings of the 2006 IEEE Workshop on Information Assurance, 2006.
Wang, Jialin, et al., "Study on a Decision Method for Reconfiguration of Network Security Functions Based on Privilege Transition Graph." IEEE, 2018 18th IEEE International Conference on Communication Technology, 2018.

(56) References Cited

OTHER PUBLICATIONS

Fan, Kai, et al., "Cross-Domain Based Data Sharing Scheme in Cooperative Edge Computing." 2018 IEEE, International Conference on Edge Computing (EDGE), IEEE, 2018.

Wang, Jun, et al., "Research on Safe Privilege Management Model in Trusted-Domains." 2008 International Symposium on Knowledge Acquisition and Modeling, 2008.

\* cited by examiner

ACCESS CONTROL FOR PROCESSOR REGISTERS BASED ON EXECUTION DOMAINS

RELATED APPLICATIONS

The present application claims the benefit of the filing date of Prov. U.S. Pat. App. Ser. No. 62/724,929, filed Aug. 30, 2018 and entitled "Access Control for Processor Registers based on Execution Domains," the entire disclosure of which application is hereby incorporated herein by reference.

FIELD OF THE TECHNOLOGY

At least some embodiments disclosed herein relate generally to computer architecture and more specifically, but not limited to, control access to registers in computer processors based on execution domains of instructions.

BACKGROUND

Instructions programmed for a computer can be structured in layers. One layer can provide resources and services for another layer. For example, a hypervisor can create or provision virtual machines that are implemented on the hardware components of the computer. An operating system can offer resources and services using resources available in a computer having predefined architecture. The computer resources or computer operated upon by the operating system can be actual computer hardware components, or virtual machine components provisioned by a hypervisor. An application can provide application specific functions using the services and resources provided by an operating system.

BRIEF DESCRIPTION OF THE DRAWINGS

The embodiments are illustrated by way of example and not limitation in the figures of the accompanying drawings in which like references indicate similar elements.

DETAILED DESCRIPTION

The present disclosure includes the techniques of controlling register access from different, non-hierarchical, domains of executions based on respective permission bits specified for a register and for the domains respectively.

In a traditional system, different layers of instructions (e.g., user applications vs. operating system) may be given different levels of privilege and/or trust. Conventionally, protection rings have been constructed and implemented in computers to protect data and functionality from fault and malicious behaviors based on a hierarchy of rings. Rings are statically arranged in the hierarchy from most privileged (and thus most trusted) to least privileged (and thus least trusted). For example, the hierarchy can include a ring of operating system kernel that is the most privileged, a ring of device drivers, and a ring of applications that are the least privileged. A program or routine in a lower privilege ring can be limited by a respective special hardware enforced control gate to access the resources and services of a higher privilege ring in the hierarchy. Gating access between rings can improve security.

In the techniques of the present disclosure, instructions or routines programmed for a computer system can be classified into a set of predefined, non-hierarchical, domains, such as a domain of hypervisor, a domain of operating system, a domain of application, etc. The routines can have instructions that, when executed in a processor, causes the processor to access a privileged register. The privileged register can have different settings for different execution domains. When an instruction in a particular execution domain requests the access to the register, a permission setting for the particular execution domain is checked. If the permission setting allows access from the execution domain, the access request is permitted; otherwise, the access request is rejected or blocked. A privileged processor register can be explicitly configured to have different permissions for different domains, without relying upon a static domain hierarchy. The permission settings can be specified in a permission register that has different bits for respective permissions to access from different domains. Alternatively, the permission settings can be specified in a set of permission registers, each having a bit for the respective permission to access from a respective domain associated with the respective permission register.

Figure 1:
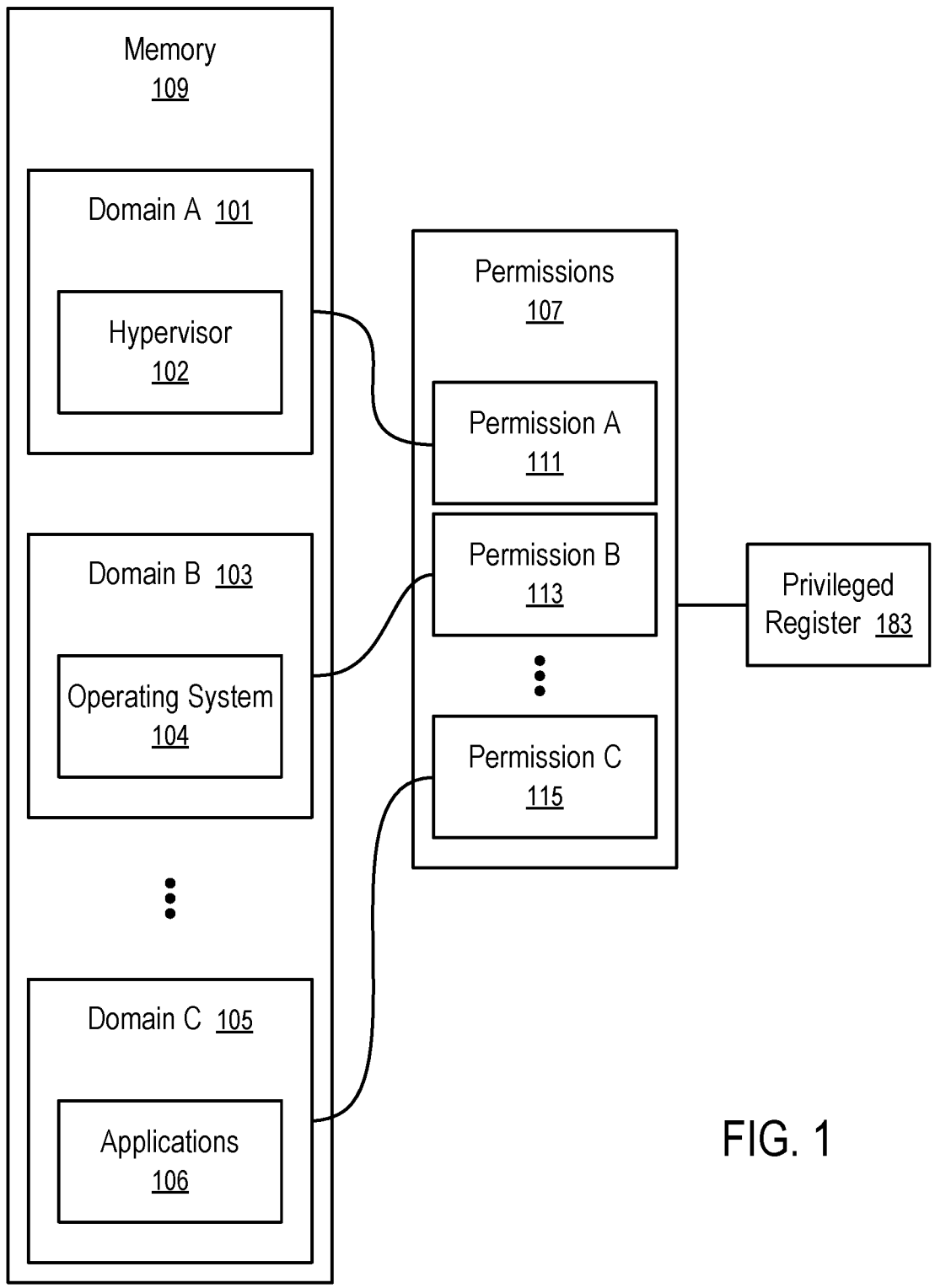
FIG. 1 shows a system to control register access according to some embodiments.

FIG. 1 shows a system to control register access according to some embodiments.

The system of FIG. 1 includes a register (183) that can be used to store data and/or instructions in a processor of a computer system. The register (183) has a set of configurable permissions (107) for routines of different domains (101, 103, . . . , 105). The permissions (107) can be specified, for example, in a permission register or a set of permission registers, as discussed further below.

In general, a routine can include a pre-programmed set of instructions stored in the memory (109). The routine can also have input data, output data, and/or, temporary data stored in the memory (109). A routine can invoke or call another routine for services and/or resources.

A routine can be classified as being in one of the predefined domains (101, 103, . . . , 105). For example, routines of a hypervisor (102) can be classified in a domain A (101); routines of an operating system (104) can be classified in another domain B (103); and routines of applications (106) can be classified in a further domain C (105).

For example, memory addresses for loading the instructions of a routine can include an object identifier that identifies a domain (e.g., 101, 103, . . . , 105) when the routine is loaded for execution in the computer system. In other examples, the object identifier is part of a virtual address space and does not specify a domain. In some implementations, a page table entry for converting a virtual memory address to a physical memory address can include information identifying the domain of routines stored in the memory region identified by the page table entry.

For example, a register (183) of a processor can store the identifier of the domain of a routine while the routine is being executed in the processor (169).

In general, a calling routine and a called routine can be in a same domain or different domains (e.g., 101, 103, . . . , 105).

In FIG. 1, the register (183) can have different permissions (111, 113, . . . , 115) for the different domains (101, 103, . . . , 105). When an instruction executed in one respective domain (e.g., 101, 103, . . . , or 105) requests to access the register (183), the respective permission (e.g., 111, 113, . . . , 115) for the respective domain (e.g., 101, 103, . . . , or 105) controls the access.

Thus, the register (183) has explicit permissions (111, 113, . . . , 115) specified separately for the domains (101, 103, . . . , 105) respectively (e.g., non-hierarchical), without relying upon a predefined hierarchy of trust for the domains (101, 103, . . . , 105).

In some instances, the register (183) can be accessed for different types of operations, such as read, write, execution, etc. The permission (e.g., 111, 113, . . . , or 115) for a particular domain (e.g., 101, 103, . . . , 105) can have separate permission bits for the respective types of operations (e.g., read, write, and/or execution).

For example, the permissions (107) can be configured to allow an instruction running in one domain (e.g., 101, 103, . . . , 105) to access the register (183) for one type of operations (e.g., read) but not for another type of operations (e.g., write).

For example, the permissions (107) can be configured to allow an instruction executing in one domain (e.g., 103) to access the register (e.g., 183) via one permission setting (e.g., 113) for the domain (e.g., 103), but prohibit the same instruction running in another domain (e.g., 101) from accessing the register (183) via another concurrent setting (e.g., 111) for that domain (e.g., 101), even when the disallowed domain (e.g., 101) can be more privileged (and thus trusted) than the allowed domain (e.g., 103) in traditional protection rings.

In one implementation, the permissions (107) are hardwired in a processor for the register (183). In another implementation, the permissions (107) are set via firmware for the register (183) of a processor during a start-up/boot up process of a computer system. In a further implementation, the permissions (107) can be changed via privileged software during the normal operations of the computer system.

For example, the permissions (107) can be changed when the processor switches from running a program in one domain (e.g., 101) to running a program in another domain (e.g., 103).

For example, the permissions (107) can be changed in accordance with a request when the computer system switches from running one routine to another routine, where the routines can be in the same domain (e.g., 101).

Figure 2:
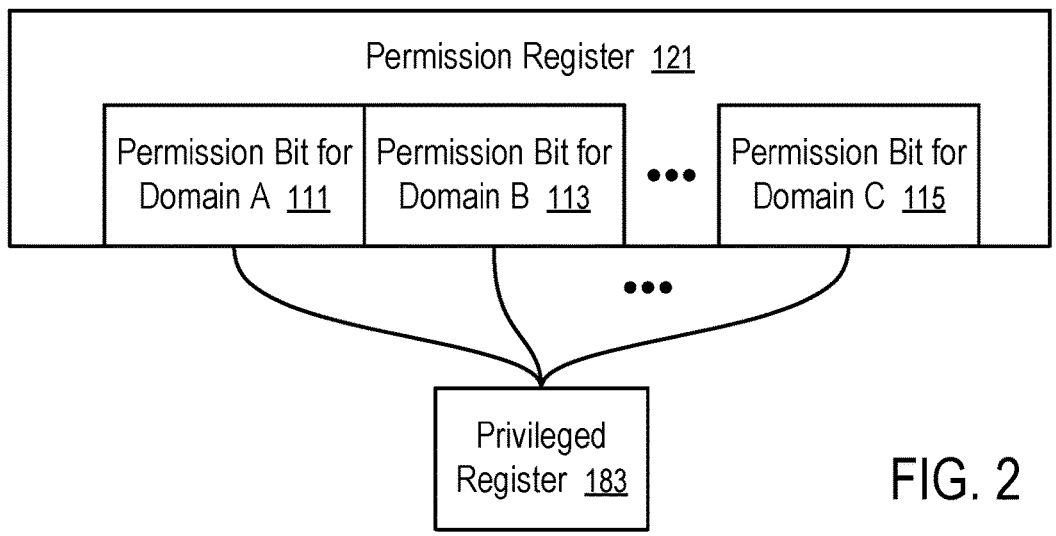
FIG. 2 shows a permission register to control register access according to some embodiments.

For example, the permissions (107) can be configured in a permission register (121) illustrated in FIG. 2 that controls access to the register (183) using the permission bits stored in the permission register; and the content of the permission register (121) can be updated by an authorized process to adjust/customize the security level of the computer system for the current computation. Alternatively, permissions for different domains (101, 103, . . . , 105) can be specified in different registers (121, 123, . . . , 125), as illustrated in FIG. 3.

FIG. 2 shows a permission register (121) to control access to a privileged register (183) according to some embodiments. In FIG. 2, permissions (111, 113, . . . , 115) for accessing the same privileged register (183) by routines running in different domains (101, 103, . . . , 105) are specified in the same permission register (121). Optionally, different portions of the permission register (121) can be used to specify the permission settings for different privileged registers (e.g., 183). Alternatively, the permissions (e.g., 111, 113, . . . , 115) for each privileged register (e.g., 183) can be specified in a separate permission register (e.g., 121).

Figure 3:
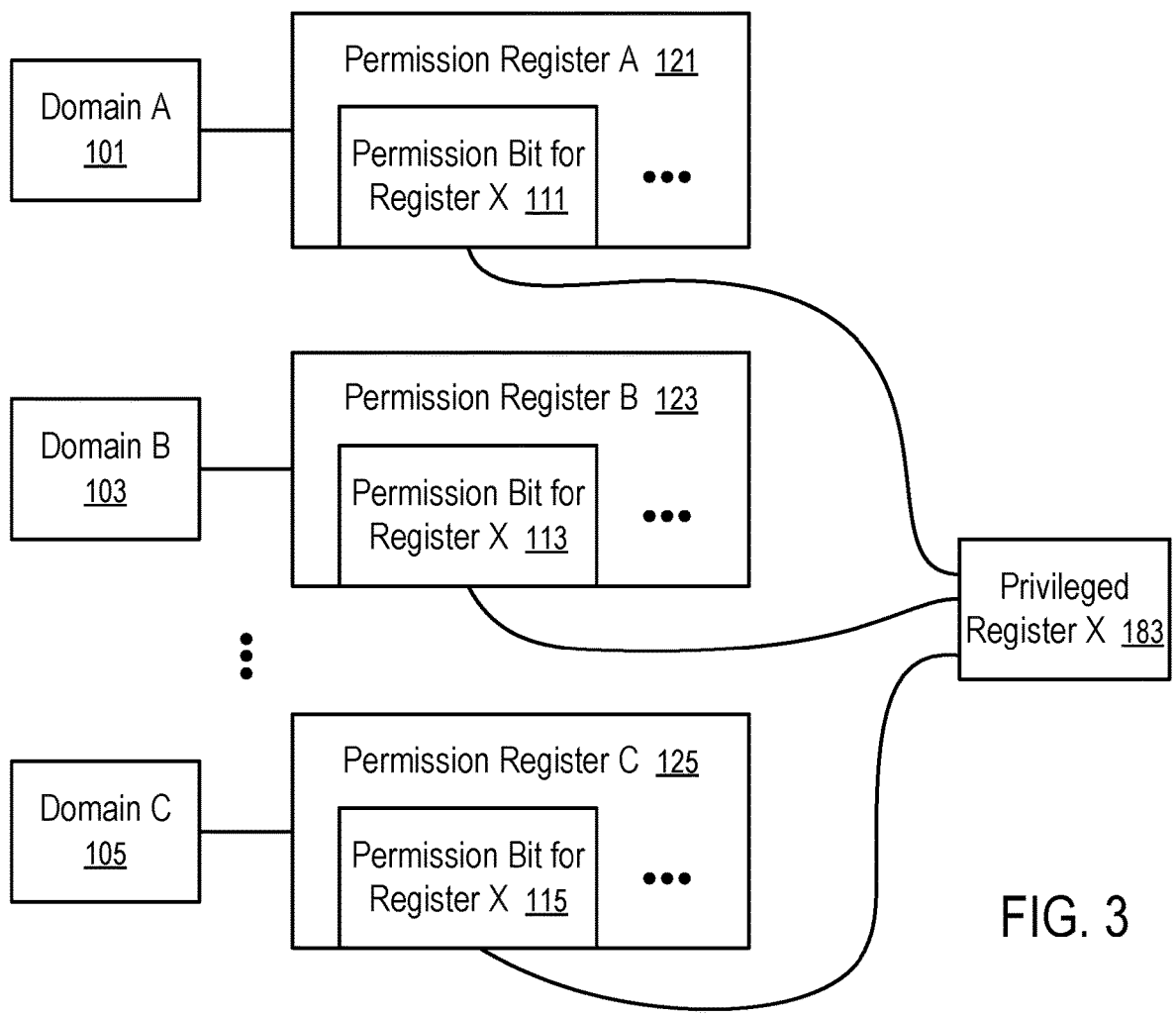
FIG. 3 shows a set of permission registers to control register access according to some embodiments.

FIG. 3 shows a set of permission registers (121, 123, . . . , 125) to control register access from a set of execution domains (101, 103, . . . , 105) respectively according to some embodiments. In FIG. 3, permissions (111, 113, . . . , 115) for different domains (101, 103, . . . , 105) to access the same privileged register (183) are specified in different permission registers (121, 123, . . . , 125). Each of the permission registers (121, 123, . . . , 125) specifies the permissions for accessing from the same domain (e.g., 101, 103, . . . , or 105) that is pre-associated with the permission register (e.g., 121, 123, . . . , or 125). A permission bit (e.g., 111) at a predetermined location in the permission register (e.g., 121) controls the access to the privileged register (183) for accesses from a domain (e.g., 101) that is associated with the permission register (e.g., 121). Different permission bit at different locations in the permission register (e.g., 121) can control the access to different privileged registers (e.g., 183) for accesses by routines running in the domain (e.g., 101) that is pre-associated with the permission register (e.g., 121).

Figure 4:
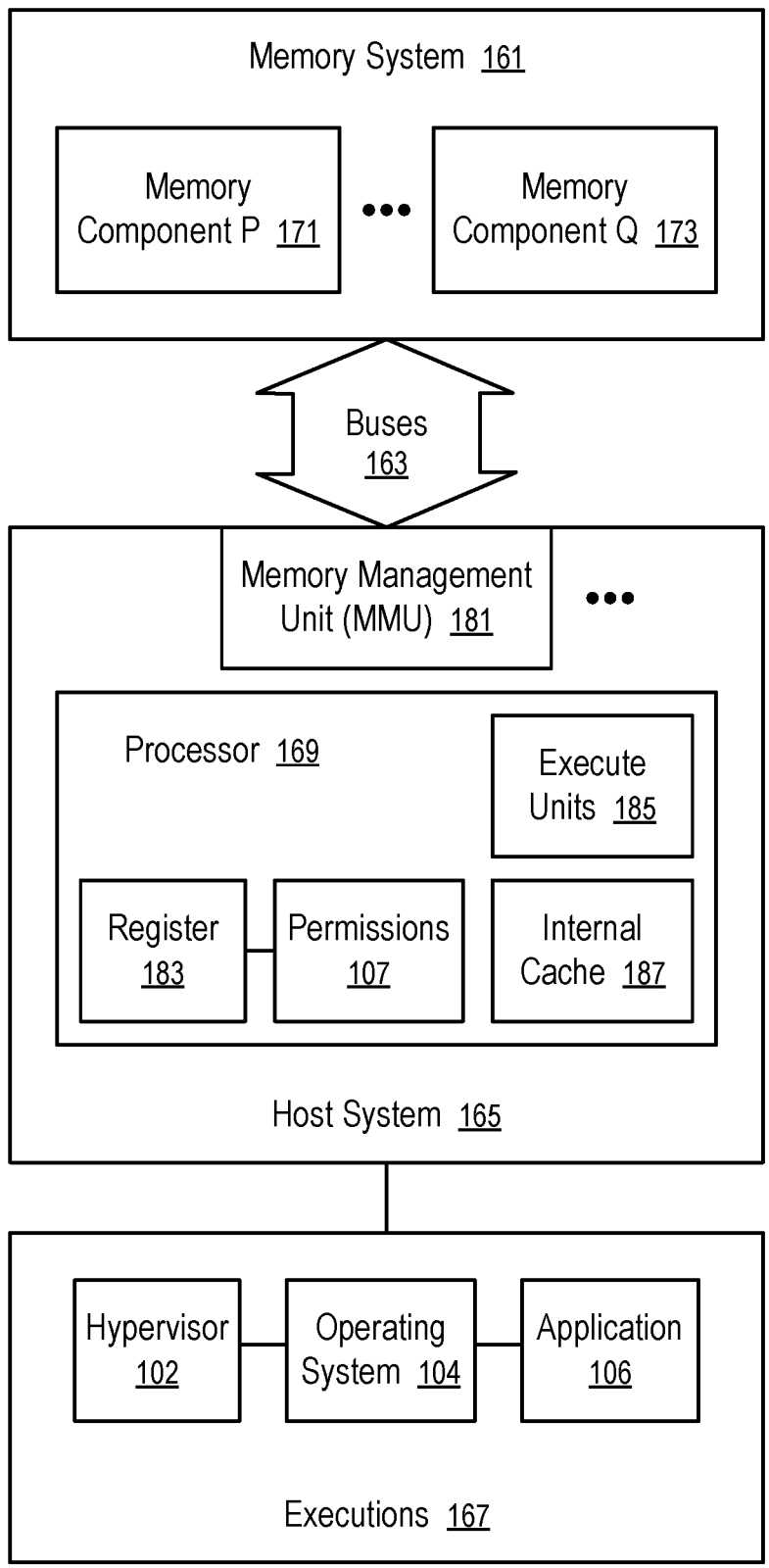
FIG. 4 shows a computer system having register access permissions configured according to FIG. 1.

FIG. 4 shows a computer system having register access permissions (107) configured according to FIG. 1 for execution domains (101, 103, . . . , 105).

The computer system of FIG. 4 has a host system (165) coupled to a memory system (161) via one or more buses (163). The memory system (161) has memory components (171, . . . , 173).

For example, the buses (163) can include a memory bus connecting to one or more memory modules and/or include a peripheral internet connecting to one or more storage devices. Some of the memory components (171, . . . , 173) can provide random access; and the some of the memory components (171, . . . , 173) can provide persistent storage capability. Some of the memory components (171, . . . , 173) can be volatile in that when the power supply to the memory component is disconnected temporarily, the data stored in the memory component will be corrupted and/or erased. Some of the memory components (171, . . . , 173) can be non-volatile in that the memory component is capable of retaining content stored therein for an extended period of time without power.

In general, a memory system (161) can also be referred to as a memory device. An example of a memory device is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory device is a storage device that is connected to the central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). In some instances, the memory device is a hybrid memory/storage system that provides both memory functions and storage functions.

The memory components (171, . . . , 173) can include any combination of the different types of non-volatile memory components and/or volatile memory components. An example of non-volatile memory components includes a negative-and (NAND) type flash memory with one or more arrays of memory cells such as single level cells (SLCs) or multi-level cells (MLCs) (e.g., triple level cells (TLCs) or quad-level cells (QLCs)). In some instances, a particular memory component can include both an SLC portion and an MLC portion of memory cells. Each of the memory cells can store one or more bits of data (e.g., data blocks) used by the host system (165). Alternatively, or in combination, a memory component (171, . . . , or 173) can include a type of volatile memory. In some instances, a memory component (171, . . . , or 173) can include, but is not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and/or a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

In general, a host system (165) can utilize a memory system (161) as physical memory (109) that includes one or more memory components (171, . . . , 173). The host system (165) can load instructions from the memory system (161) for execution, provide data to be stored at the memory system (161), and request data to be retrieved from the memory system (161).

In FIG. 4, the host system (165) includes a memory management unit (MMU) (181) and a processor (169). The processor (169) has execution units (185), such as an arithmetic-logic unit. The processor (169) has registers (e.g., 183) to hold instructions for execution, data as operands of instructions, and/or results of instruction executions. The processor (169) can have an internal cache (187) as a proxy of a portion of the memory system (161).

In FIG. 4, the host system (165) further includes a storage element for permissions (107) associated with the register (183). The permissions (107) include separate settings (111, 113, . . . , 115) for redefined domains (101, 103, . . . , 105) of executions, as illustrated in FIG. 1. Further, the permissions (107) can include separate settings for different types of register access, such as retrieving data from the register (183), storing data into the register (183), executing an instruction stored in the register (183), etc.

For example, the storage element of the permission (107) can be a permission register (121) (illustrated in FIG. 2), or a set of permission registers (121, 123, . . . , 125) (illustrated in FIG. 3), that has content controlling the access to the register (183), based on a current domain (e.g., 101, 103, . . . , 105) of execution. The current domain of execution can be determined from the domain of the routine running in the processor (169), the memory address of an instruction or routine that is being executed in the processor (169), or a domain identified in a domain register of the processor (169).

In some instances, the host system (165) can include multiple processors (e.g., 169) integrated on a same silicon die as multiple processing cores of a central processing unit (CPU).

Routines programmed for executing in the processor (169) can be initially stored in the memory system (161).

The routines can include instructions for a hypervisor (102), an operating system (104), and an application (106). The routines stored initially in the memory system (161) can be loaded to the internal cache (187) and/or the registers (183) for execution in the execution units (185).

The running instances of the routines form the executions (167) of the hypervisor (102), the operating system (104), and the application (106). In some instances, a hypervisor (102) is not used; and the operating system (104) controls the hardware components (e.g., the memory system (161), peripheral input/output devices, and/or network interface cards) without a hypervisor.

The executions (167) of the hypervisor (102), the operating system (104), and/or the application (106) can access memory (123) (e.g., in memory components (171, . . . , 173)) using virtual memory addresses defined in one or more virtual memory spaces. The memory access can be optionally controlled via permission bits specified for the types of accesses and/or the execution domains (101, 103, . . . , 105) of the routines. The permission bits can be specified in page table entries used to translate the virtual memory addresses to physical memory addresses used by the memory management unit (181) to access the memory system (161).

As illustrated in FIG. 1, the executions of the routines of hypervisor (102), the operating system (104), and the application (106) can be organized into a plurality of domains (101, 103, . . . , 105). For each of the execution domains (101, 103, . . . , 105) and a particular register (183), the permissions (107) has a bit indicating whether a respective domain (101, 103, . . . , or 105) is allowed to access the register (183). Different privileged registers in the processor (169) can have different sets (e.g., 107) of permissions. The different sets (e.g., 107) of permissions can be stored in one permission register (121 illustrated in FIG. 2), or a set of permission registers (121, 123, . . . , 125 illustrated in FIG. 3) where different portions of the permission register has different sets (e.g., 107) of permissions to control access to different privileged registers.

Similarly, the permission bits specified in a page table entry can have permission bits indicating whether a respective domain (101, 103, . . . , or 105) is allowed to access the memory region identified by the page table entry. Different memory regions corresponding to different page table entries in the memory system (161) can have different sets of permissions stored in the respective page table entries. Further, the permissions can be separately specified for different types of memory access operations, such as read, write, execute, etc. For example, the page table entry can include a page fault bit indicating whether the page is in the main memory of the computer or in a storage device of the computer. If the permissions allow the current access to the page of memory and the page fault bit indicate that the page is currently not in the main memory of the computer, the memory management unit (181) can swap the page from the storage device into the main memory of the computer to facilitate the access to the page identified by the page table entry. However, if the permissions deny the current access to the page for the current execution domain, it is not necessary to evaluate the page fault bit and/or to swap in the page corresponding to the page table entry.

Figure 5:
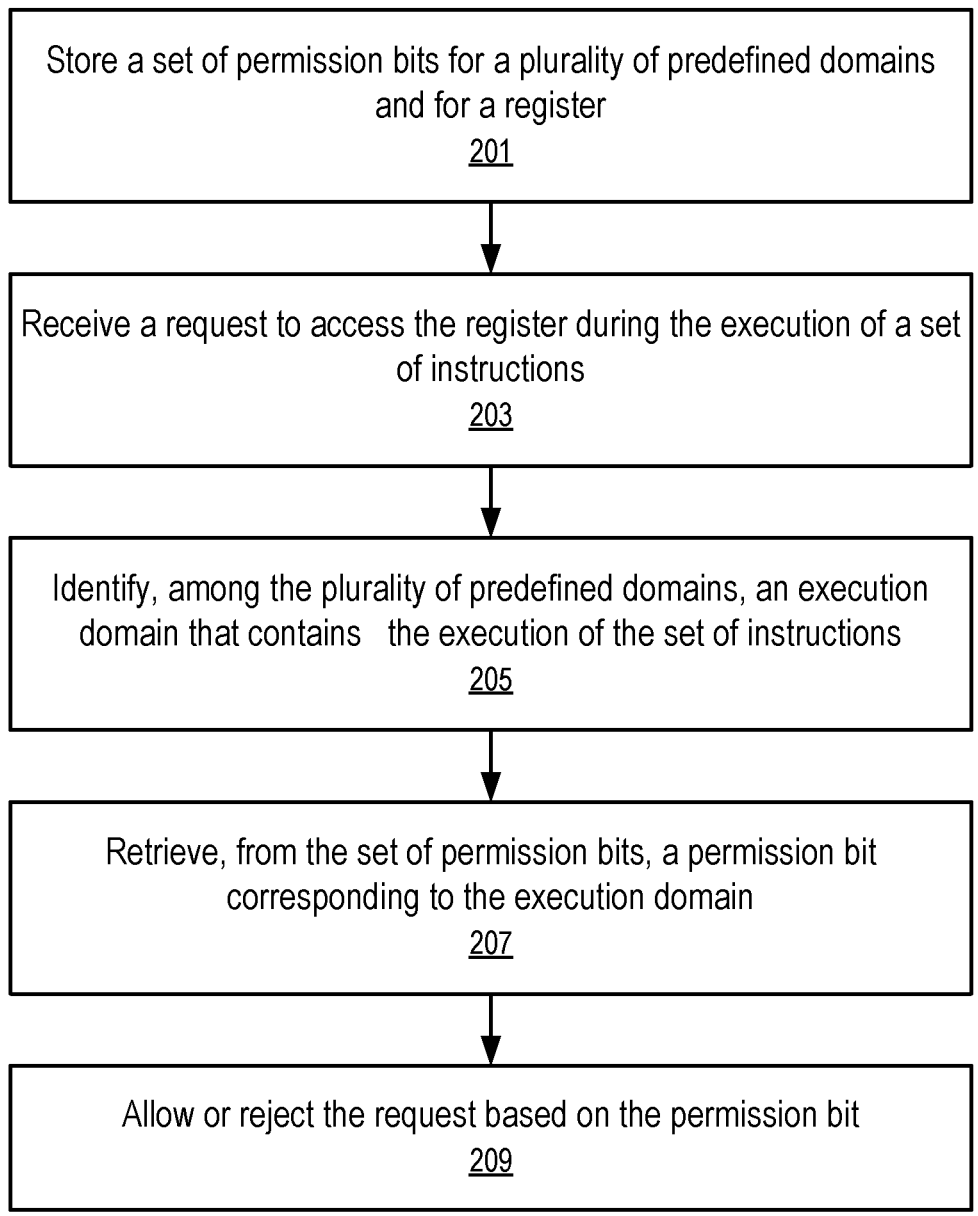
FIG. 5 shows a method to control register access for execution domains.

FIG. 5 shows a method to control register access for execution domains (101, 103, . . . , 105).

For example, the method of FIG. 5 can be performed in a computer system of FIG. 4, using a register permission (107) for respective execution domains (101, 103, . . . , 105) illustrated in FIG. 1.

At block 201, a processor (169) stores a set (107) of permission bits (111, 113, . . . , 115) for a plurality of predefined domains (101, 103, . . . , 105) and for a register (183).

For example, the permission bits (111, 113, . . . , 115) can be stored in a predetermined portion of a permission register (121 illustrated in FIG. 2) of the processor (169) corresponding to the privileged register (183), or stored in predetermined locations in a set of permission registers (121, 123, . . . , 125 illustrated in FIG. 3) for the set of domains (101, 103, . . . , 105) respectively. Different portions of the permission register can store different permission data for different privileged register (183).

At block 203, the processor (169) receives a request (e.g., for an execution unit (185) executing an instruction) to access the register (183) during the execution of a set of instructions.

For example, the set of instructions can be a routine of a hypervisor (102), an operating system (104), or an application (106). Thus, the execution of the routine can be classified as in one of the set of predetermined domains (101, 103, . . . , 105) illustrated in FIG. 1.

At block 205, the processor (169) identifies, among the plurality of predefined domains (101, 103, . . . , 105), an execution domain (e.g., 101) that contains the execution of the set of instructions.

For example, memory addresses for storing instructions of a routine can include an object identifier that determines the domain (e.g., 101, 103, . . . , 105) when the routine is being executed in the processor (169). In other examples, the object identifier is part of a virtual address space and does not specify a domain. In some implementations, a page table entry for converting a virtual memory address to a physical memory address can include information identifying the domain of routines stored in the memory region identified by the page table entry.

For example, a register of the processor can store the identifier of the domain of a routine while the routine is being executed in the processor (169).

At block 207, the processor (169) retrieves, from the set of permission bits (111, 113, . . . , 115), a permission bit (e.g., 111) corresponding to the execution domain (e.g., 101).

At block 209, the processor (169) allows or rejects the request based on the permission bit (e.g., 111).

For example, if the request is rejected, a trap to the software designated to handle the rejection can be used.

The techniques disclosed herein can be applied to at least to computer systems where processors are separated from memory and processors communicate with memory and storage devices via communication buses and/or computer networks. Further, the techniques disclosed herein can be applied to computer systems in which processing capabilities are integrated within memory/storage. For example, the processing circuits, including executing units and/or registers of a typical processor, can be implemented within the integrated circuits and/or the integrated circuit packages of memory media to perform processing within a memory device. Thus, a processor (e.g., 101) as discussed above and illustrated in the drawings is not necessarily a central processing unit in the von Neumann architecture. The processor can be a unit integrated within memory to overcome the von Neumann bottleneck that limits computing performance as a result of a limit in throughput caused by latency in data moves between a central processing unit and memory configured separately according to the von Neumann architecture.

The description and drawings of the present disclosure are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A method, comprising:
   storing a set of permission bits for a plurality of predefined domains and for a register of a processor in a set of permission registers, wherein each of the plurality of predefined domains has its own corresponding permission register in the set of permission registers, and wherein each corresponding permission register is accessible only to a predefined domain of the plurality of predefined domains to which the respective corresponding permission register is associated, wherein the plurality of predefined domains comprises at least one of each of a domain for hypervisor, a domain for operating system, and a domain for application;
   receiving, in the processor, a first request to access the register during a first execution of a first set of instructions;
   identifying, among the plurality of predefined domains, a first execution domain that contains the first execution of the first set of instructions;
   retrieving, from a first permission register of the set of permission registers, a first permission bit corresponding to the first execution domain; and
   controlling, by the processor and based on the first permission bit, the first request to access the register;
   receiving, in the processor, a second request to access the register during a second execution of a second set of instructions;
   identifying, among the plurality of predefined domains, a second execution domain that contains the second execution of the second set of instructions;
   retrieving, from a second permission register of the set of permission registers, a second permission bit corresponding to the second execution domain; and
   controlling, by the processor and based on the second permission bit, the second request to access the register.

2. The method of claim 1, wherein the storing comprises:
   storing the set of permission bits in a predefined portion of a second register of the processor.

3. The method of claim 2, wherein the first request to access the register is controlled for a type of operations based at least in part on a value of the permission bit corresponding to the first execution domain.

4. The method of claim 3, wherein the type comprises at least one of read, write, or execution, or a combination thereof.

5. A computer processor, comprising:
   at least one privileged register;
   at least one execution unit; and
   a plurality of permission registers each configured to store permission data corresponding to the privileged register and one of a plurality of predefined domains of instruction execution, wherein each one of the plurality of permission registers is accessible by only a single one of the plurality of predefined domains, wherein the plurality of predefined domains comprises at least one of each of a domain for hypervisor, a domain for operating system, and a domain for application;

wherein the computer processor is configured to control a request to access the privileged register based on a permission bit in the permission data corresponding to a domain in which an instruction is being executed in the computer processor to generate the request, and wherein the plurality of predefined domains comprises instructions for execution of all stored in a single memory that are executable based on the permission data in the plurality of permission registers permissions.

6. The computer processor of claim 5, wherein the at least one privileged register includes a plurality of privileged registers; and the at least one permission register has a plurality of portions storing permission data for the plurality of privileged registers respectively.

* * * * *